: 3,146,272
ANTIOXIDANTS FOR GLYCOL DERIVATIVES
William G. Lloyd, Bay City, Mich., assignor to The Dow
 Chemical Company, Midland, Mich., a corporation of
 Delaware
No Drawing. Filed Apr. 2, 1959, Ser. No. 803,568
10 Claims. (Cl. 260—611.5)

The invention relates to antioxidants for polyoxyalkylene compounds and to such compounds stabilized against oxidative deterioration.

Polyglycols and their ethers and esters are widely used for a great many purposes, many of such uses involving exposure to air and/or heat whereby the polyglycol composition suffers oxidative deterioration. Many conventional antioxidants, such as the aromatic hydroxy and amino compounds, are effective in polyoxyalkylene compounds and compositions but have several objectionable features. Thus, many are toxic or irritating to animal life; others impart undesirable color or odor to the compositions; and finally, some are difficult to incorporate into the compositions because of limited solubility, or else they are lost therefrom through volatilization, phase separation, preferential extraction or other mechanism.

It is an object of this invention to provide antioxidants for polyoxyalkylene compounds which avoid the above disadvantages. Another object is to provide polyoxyalkylene compounds and compositions containing such antioxidants.

The term "polyoxyalkylene compound" as used herein refers to polyoxyalkylene glycols and their functional derivatives, particularly the ethers and esters. The term includes compounds wherein the alkylene radicals bear substituent radicals such as phenyl, chlorine, bromine or hydroxyl or contain olefinic unsaturation. Typical examples of such compounds include polyoxyethylene glycols, polyoxypropylene glycols, polyepichlorohydrin, polyglycidol, poly(styrene glycol), polyoxy-1,2- or 2,3-butylene glycols, mixed polyoxyalkylene glycols wherein the polymer chains contain two or more different oxyalkylene units, either as a random sequence (heteric) or as segregated blocks (block copolymers), and the mono- and di-ethers and esters thereof.

According to the invention, those polyoxyalkylene compounds that are sensitive to oxidative deterioration in normal use are stabilized against such deterioration by the addition thereto of one or more compounds having the formula $$R(C_nH_{2n}O)_x\text{---}H$$

wherein R is a monovalent radical derived from a compound, RH, having the property of being effective as an antioxidant for polyoxyalkylene compounds, and of being reactive with alkylene oxides, $n$ is an integer from 2 to 4, and $x$ is an integer from 1 to about 100, or an alkyl ether or acyl ester of such compound.

Antioxidants of the above type are conveniently made by condensing an alkylene oxide, $C_nH_{2n}O$, with the compound RH by any of the conventional processes for such condensations. Suitable oxides include ethylene, propylene, 1,2- and 2,3- butylene oxides and the like. Suitable compounds, RH, with which to condense the oxides include phenols, alkylphenols, arylphenols, aralkylphenols, phenothiazine, phenothiazine-5-oxide, alkyl- and halogen-substituted phenothiazine and the corresponding 5-oxides, arylsulfonamides, arylamines, N-alkylarylamines, alkarylamines and, in general, any compound that is an antioxidant for polyoxyalkylene compounds and that is reactive with alkylene oxides.

The amount of the new antioxidants required in a polyoxyalkylene compound varies widely depending on the particular materials used and the severity of the use conditions under which inhibition of oxidation is desired. Under ordinary conditions as little as 1% by weight of the stabilizer may be adequate whereas under severe conditions of prolonged exposure to high temperatures and air, as much as 50% might be desirable.

Oxidative deterioration of polyoxyalkylene compounds results in formation of peroxides, acids and carbonyl compounds and is commonly manifested by color changes, decrease in viscosity and, especially, formation of volatile byproducts. The latter property is the basis for a commonly used accelerated oxidation stability test in which the compound is maintained at an elevated temperature while exposed to air or oxygen, the oxidation products are volatilized and the extent of oxidation is measured by determining the loss in weight. Alternatively, the susceptibility of the compound to oxidation may be measured by the rate or extent of absorption of oxygen during the accelerated test.

The invention is illustrated by the following examples.

EXAMPLES 1–44

*General procedure.*—The antioxidant and the polyoxyalkylene compound to be protected were mixed in a definite proportion, a measured amount of the mixture was placed in an oven heated at a constant temperature and the weight loss after a fixed period was measured. The results of such tests are shown in the following tables.

The results shown in Table I were obtained in a series of tests in which 10-gram samples were heated at 220° F. for 192 hours. The polyoxyalkylene compounds used are identified as follows:

E–600 _____ Polyoxyethylene glycol of average mol. wt. 600.
E–1000 _____ Polyoxyethylene glycol of average mol. wt. 1000.
E–2000 _____ Polyoxyethylene glycol of average mol. wt. 2000.
P–2000 _____ Polyoxypropylene glycol of average mol. wt. 2000.
P–400 BME ___ Butyl methyl diether of P–400.
E–600 ME _____ Monomethyl ether of E–600.
B–300 _____ Polyoxybutylene glycol of average mol. wt. 300.
PG 15–200 ____ Glycerol condensed with a mixture of 40 moles each of ethylene oxide (EO) and propylene oxide (PO).
PG 59–1 _____ Tridecyl alcohol condensed with 10 moles of EO.

The antioxidants used are identified as follows:

A _____ Octylphenol condensed with 10 moles of EO.
B _____ Phenothiazine condensed with 10 moles of EO.
C _____ Phenol condensed with 6 moles of EO.
D _____ N-ethyl toluenesulfonamide with 10 moles of EO.
E _____ Di-sec.-butylphenol with 10 moles of EO.
F _____ 2,4-bis (α-methylbenzyl)phenol with 10 moles of EO.

Table I.—Antioxidant Tests

| Example No. | Polyoxyalkylene Compound | Antioxidant Compound | Amount, percent by wt. | Wt. Loss, percent |
|---|---|---|---|---|
| 1 | E-1000 | none | | 11.6 |
| 2 | E-1000 | A | 25 | 6.2 |
| 3 | E-1000 | B | 25 | .4 |
| 4 | E-1000 | D | 25 | 2.6 |
| 5 | E-1000 | E | 25 | 3.3 |
| 6 | P-2000 | none | | 26.1 |
| 7 | P-2000 | A | 25 | 9.2 |
| 8 | P-2000 | B | 25 | .8 |
| 9 | P-2000 | C | 25 | 17.2 |
| 10 | P-2000 | D | 25 | 15.5 |
| 11 | P-2000 | E | 25 | 6.7 |
| 12 | B-300 | none | | 82.7 |
| 13 | B-300 | A | 25 | 51.7 |
| 14 | B-300 | B | 25 | 45.9 |
| 15 | B-300 | D | 25 | 48.0 |
| 16 | B-300 | E | 25 | 54.8 |
| 17 | PG 15-200 | none | | 14.3 |
| 18 | PG 15-200 | A | 25 | 8.2 |
| 19 | PG 15-200 | B | 25 | .5 |
| 20 | PG 15-200 | D | 25 | 3.4 |
| 21 | PG 15-200 | E | 25 | 5.8 |
| 22 | E-600 ME | none | | 12.7 |
| 23 | E-600 ME | A | 25 | 8.3 |
| 24 | E-600 ME | B | 25 | .9 |
| 25 | E-600 ME | D | 25 | 2.7 |
|    | E-600 ME | E | 25 | 8.7 |
| 26 | P-400 BME | none | | 96.0 |
| 27 | P-400 BME | A | 25 | 41.5 |
| 28 | P-400 BME | B | 25 | 27.7 |
| 29 | P-400 BME | E | 25 | 38.0 |
| 30 | none | A | 100 | 3.9 |
| 31 | none | B | 100 | .4 |
| 32 | none | C | 100 | 16.2 |
| 33 | none | D | 100 | 7.0 |
| 34 | none | E | 100 | 3.5 |

Other tests were run similarly to those in Table I except that 2-gram samples were used, the temperature was 100° C., the time was 50 hours and the percentage of antioxidant was varied. The results of these tests are shown in Table II.

Table II.—Antioxidant Tests

| Example No. | Polyoxyalkylene Compound | Antioxidant Compound | Amount, percent by wt. | Wt. Loss, percent |
|---|---|---|---|---|
| 35 | PG 59-1 | none | | 38.0 |
| 36 | PG 59-1 | E | 2 | 25.0 |
| 37 | PG 59-1 | E | 10 | 20.9 |
| 38 | PG 59-1 | E | 25 | 11.1 |
| 39 | PG 59-1 | E | 50 | 4.0 |
| 40 | B-500 | none | | 14.1 |
| 41 | B-500 | E | 25 | 7.0 |
| 42 | P-750 | none | | 57.5 |
| 43 | P-750 | E | 25 | 17.1 |
| 44 | none | E | 100 | 1.0 |

EXAMPLE 45

In other tests generally similar to those above, Antioxidant F was tested by mixing it with an equal weight of PG 15-200 and heating a sample in an oven at 210° F. for 144 hours. During this time the sample lost only 4% of its weight whereas similar samples of pure Antioxidant F and PG 15-200 lost 1.0% and 40%, respectively.

EXAMPLE 46

An antioxidant was made by condensing phenothiazine with 12 molar equivalents of ethylene oxide. A mixture of 10.4% by weight of the product and 89.6% of P-400 was tested along with pure P-400. The test was for oxygen absorption when exposed for 5 hours at 126° C. to a pure oxygen atmosphere. The pure P-400 absorbed oxygen at the rate of 41.7 millimoles per liter per hour whereas that containing the antioxidant absorbed at the rate of only 1.4 millimoles per liter per hour.

Effective antioxidant action is obtained when the above antioxidants are used in other polyoxyalkylene compounds. Likewise, other effective antioxidants are obtained when ethylene, propylene or butylene oxide or mixtures thereof are condensed in substantially any molecular proportion with an antioxidant having a hydrogen atom reactive with alkylene oxides, as hereinbefore set forth. Esterification or etherification of the antioxidants thus obtained has little effect on their antioxidant properties.

Applications in which polyoxyalkylene compounds are widely used and in which the antioxidants of the present invention are effective and desirable include heat-transfer fluids, hydraulic fluids, metal-working lubricants, gas-washing fluids for dehumidification and/or deacidification, solvents used in petroleum refining, and the like.

I claim:

1. A composition comprising a mixture of a major proportion of a first polyoxyalkylene compound wherein the alkylene radicals each contain 2 to 4 carbon atoms, said compound being susceptible to oxidative deterioration and, as an oxidation inhibitor therefor, a minor but effective proportion of about 1 to 50 percent by weight of a second polyoxyalkylene compound having the formula $R(C_nH_{2n}O)_xR'$, wherein R is a monovalent radical derived from a compound, RH, having the property of being effective as an antioxidant for said first polyoxyalkylene compound and reactive with a lower alkylene oxide, $n$ is an integer from 2 to 4, $x$ is an integer from 1 to about 100 and R' is a monovalent radical selected from the group consisting of hydrogen, alkyl and acyl radicals, said compound, RH, being selected from the group consisting of phenols, phenothiazine, phenothiazine-5-oxide, alkyl- and halogen-substituted phenothiazine and the corresponding 5-oxides, arylsulfonamides and arylamines.

2. A composition as defined in claim 1 wherein RH is a phenol.

3. A composition as defined in claim 2 wherein RH is an alkylated phenol.

4. A composition as defined in claim 1 wherein RH is an arylsulfonamide.

5. A composition as defined in claim 1 wherein RH is phenothiazine.

6. A composition as defined in claim 1 wherein RH is 2,4-bis(α-methylbenzyl)phenol.

7. The process of inhibiting the oxidation of a polyoxyalkylene compound when exposed to conditions under which it would normally undergo oxidative deterioration comprising maintaining in said compound a minor but effective amount of about 1 to 50 percent by weight of the antioxidant defined in claim 1.

8. A composition as defined in claim 2 wherein the first polyoxyalkylene compound is a polyoxyalkylene glycol and R' is hydrogen.

9. A composition as defined in claim 5 wherein the polyoxyalkylene compound is a polyoxyalkylene glycol and R' is hydrogen.

10. A composition as defined in claim 1 wherein the first polyoxyalkylene compound is a polyoxyalkylene glycol having a molecular weight of about 300 to 2000, the compound RH is phenothiazine, the alkylene oxide is ethylene oxide, R' is hydrogen and $x$ is an integer from about 6 to about 12.

References Cited in the file of this patent

UNITED STATES PATENTS

| 2,674,619 | Lundsted | Apr. 6, 1954 |
| 2,677,700 | Jackson et al. | May 4, 1954 |
| 2,786,080 | Patton | Mar. 19, 1957 |